United States Patent [19]

Hopkins

[11] 4,256,612

[45] Mar. 17, 1981

[54] PREPARATION OF EPOXY RESIN-RUBBER-GLASS MIXTURE AND MIXTURE PRODUCED

[76] Inventor: Harry C. Hopkins, 15 Lafayette St., White Plains, N.Y. 10606

[21] Appl. No.: 59,905

[22] Filed: Jul. 23, 1979

[51] Int. Cl.³ .................. C08L 7/00; C08L 17/00; C08L 63/00
[52] U.S. Cl. ............................. 260/2.3; 260/3; 260/4 R; 260/4 AR; 260/5; 260/37 EP; 260/28.5 AS; 525/122
[58] Field of Search ............ 260/2.3, 3, 4 R, 4 AR, 260/5, 37 EP; 525/122

[56] References Cited

U.S. PATENT DOCUMENTS 3,026,271  3/1962  Achterhof et al. .............. 260/2.3

*Primary Examiner*—Harold D. Anderson
*Attorney, Agent, or Firm*—Brumbaugh, Graves, Donohue & Raymond

[57] ABSTRACT

Molded objects are formed from rubber and glass products, e.g. discarded glass and rubber, by grinding the rubber and glass into small particles and then melting them in separate kilns. The melted glass and rubber are then mixed together in various proportions, i.e. 20–80% by volume of the glass being added to the rubber. An epoxy resin in an amount of 0.5–1.5% is added as a binder while the melt is being mixed to a uniform consistency. Before the melt can solidify, it is poured into a mold. Small quantities of water and/or sand may also be added to the melt if desired.

10 Claims, No Drawings

PREPARATION OF EPOXY RESIN-RUBBER-GLASS MIXTURE AND MIXTURE PRODUCED

BACKGROUND OF THE INVENTION

This invention relates to the utilization of rubber and glass materials and, more particularly, to the utilization of used rubber and glass materials to form a new composition.

Industrialized societies produce large quantities of waste materials which are typically incinerated and then used as landfill. However, in recent years there have been increased efforts to recover the valuable products from this waste. In particular ferrous metals have been separated from the waste by magnetic attraction and have been melted, combined with new metal and used to form new metallic products. Rubber from tires has been reused to form new tires. Attempts have also been made to convert animal and vegetable wastes into sugars, alcohol and even hydrocarbons, e.g. methane gas, which can be used in other processes.

The glass material found in waste is typically not reused because there are more than 500 different types of glass made each year and each must be made with certain critical parameters. It would be extremely difficult to separate the various types of glass in the waste material into the type needed for a particular process.

Plastics are used to produce a number of inexpensive items. Usually, plastic objects are made from previously unused raw materials, e.g. crude oil products. If it were possible to replace these plastic objects with objects made from waste materials, there would be a saving of raw materials, particularly precious crude oil.

SUMMARY OF THE INVENTION

The present invention is directed to the formation of a rubber-glass material useful for many for the applications to which plastics are put.

In an illustrative embodiment of the invention waste rubber, e.g. from automobile tires, is reduced to a melt and is mixed with a melt of discarded glass. Small quantities of epoxy, sand and water are added. The mixture is stirred until a homogeneous mass is obtained and is then allowed to solidify in a mold. The result is a rather tough and relatively inflexible object that can replace typical plastic objects used for industrial and household applications.

DESCRIPTION OF A PREFERRED EMBODIMENT

In forming the rubber-glass material for the present invention, rubber, e.g. newly formed or from automobile tires, is ground to a sand-like consistency and is heated to about 400° F. to form a melt. At the same time, new glass or discarded glass is ground and heated to a temperature of about 2,600° F. in a separate kiln in order to form a melt. The two substances, while still in the molten state, are mixed together in a cylindrical vessel in a range of proportions, i.e. 20-80% by volume of the glass is added to the rubber. Minute quantities of an epoxy resin (approximately 0.5-1.5%), sand and water are also added at a later point. The epoxy and sand act as binders and the water is added to increase the liquidity and homogeneity of the mixture. While cooling the mixture is stirred to an even consistency and then poured into a suitable mould.

EXAMPLE

Portions of disposed ground glass and ground rubber from automobile tires were melted in separate vessels at temperatures of 2,600° F. and 400° F. respectively. The two portions were then mixed in equal proportions by volume. An epoxy resin in an amount equal to 1% of the volume of the mixture and approximately 1% by volume of sand were also added. The mixture was stirred until homogenous. Over the course of one hour the temperature dropped, but the mixture did not immediately solidify. Therefore it was possible to add small quantities of water to the mixture as it was being mixed in order to assure a uniform consistency. Before the mixture solidified it was poured into a mold and then allowed to harden over the course of another two hours.

The result was a molded object that had the following approximate quantitive properties:

| Specific Gravity | 2.8 |
| Tensile Strength | 12,000 psi |
| Compressive Strength | 40,000 psi |
| Modulus of Elasticity | $8 \times 10^6$ psi |

Qualitatively the molded object had excellent resistance to solvents and cold flow. Its resistance to abrasion and heat was very good. The object even had good resistance to oils.

When the mixture has a larger precentage of rubber it is more elastic and has much the same properties as hard rubber. If the mixture has more glass, the end product is somewhat like thin sheet metal. Naturally the thickness of the cast product affects its final properties.

Because of its properties the mixture can be used to replace many plastic objects formerly prepared from crude oil products. In particular it can be molded into household products, farm implements, toys, food and beverage containers, oil and gasoline containers, paint containers, coat hangers etc. Also, if mixed with asphalt, it can be used for filling pot holes.

While the invention has been particularly shown and described with reference to a preferred embodiment thereof, it will be understood by those skilled in the art that various changes in form and details may be made therein without departing from the spirit and scope of the invention. In particular, new glass and rubber, and not discarded materials, may be employed.

I claim:

1. A process for forming a rubber-glass mixture comprising the steps of
   melting glass and rubber in separate vessels
   mixing 20-80% by volume of the melted glass with the melted rubber to form a rubber-glass melt,
   adding 0.5-1.5% epoxy resin to the melt,
   stirring the melt to a uniform consistency, and allowing the melt to solidify in a desired shape.

2. The process of claim 1 wherein discarded or waste glass and rubber are used.

3. The process of claim 2 wherein the discarded glass and rubber are ground to fine particles prior to the step of melting them.

4. The process of claim 2 wherein the discarded rubber is automobile tires.

5. The process of claim 1 wherein the rubber is melted at about 400° F. and the glass is melted at about 2,600° F.

6. The process of claim 1 wherein water is added to the melt during the step of stirring the melt.

7. The process of claim 1 wherein sand in an amount of 1% by volume is added along with the epoxy resin.

8. The process of claims 1, 2, 3, 6 or 7 wherein equal proportions by volume of melted glass and rubber are mixed to form the rubber-glass melt.

9. A product by the process of claims 1, 2, 3, 6 or 7.

10. A product according to claim 9 wherein equal proportions by volume of melted glass and rubber are mixed to form the rubber-glass melt.

* * * * *